United States Patent [19]
Sherman et al.

[11] Patent Number: 5,816,725
[45] Date of Patent: Oct. 6, 1998

[54] PORTABLE MODULAR WORK STATION INCLUDING PRINTER AND PORTABLE DATA COLLECTION TERMINAL

[75] Inventors: Richard A. Sherman, Toddville; Darald R. Schultz; Steven H. Salvay, both of Cedar Rapids; Robert B. Jaeger, Swisher; Patrick H. Davis; George E. Hanson, both of Cedar Rapids, all of Iowa

[73] Assignee: Norand Corporation, Cedar Rapids, Iowa

[21] Appl. No.: 587,192

[22] Filed: Jan. 16, 1996

Related U.S. Application Data

[60] Continuation of Ser. No. 291,305, Aug. 16, 1994, Pat. No. 5,484,991, which is a division of Ser. No. 994,428, Dec. 21, 1992, Pat. No. 5,347,115, which is a continuation-in-part of Ser. No. 759,740, Sep. 12, 1991, abandoned, said Ser. No. 994,428, Dec. 21, 1992, Pat. No. 5,347,115, Continuation-in-part of Ser. No. 616,857, Nov. 21, 1990, Pat. No. 5,186,558, said Ser. No. 759,740, Sep. 12, 1991, abandoned, Continuation-in-part of Ser. No. 634,246, Dec. 26, 1990, abandoned, which is a continuation-in-part of Ser. No. 463,748, Jan. 12, 1990, abandoned.

[51] Int. Cl.⁶ ..................................... B41J 29/02
[52] U.S. Cl. ........................... 400/692; 235/472
[58] Field of Search .............................. 235/472; 400/692

[56] References Cited

U.S. PATENT DOCUMENTS 2,024,622  12/1935  Bates .
2,794,664   6/1957  Kruger .
3,745,565   7/1973  Daines et al. .

(List continued on next page.)

FOREIGN PATENT DOCUMENTS 2567304  1/1986  France .
8438263  3/1985  Germany .
8500180  6/1985  Germany .

(List continued on next page.)

OTHER PUBLICATIONS

IBM Technical Disclosure Bulletin, vol. 27, No. 11, Apr. 1985. "Handle Used as Battery Compartment".
Norand Route–Commander, Copright 1985. "40–column Hand–Held Printer".

(List continued on next page.)

*Primary Examiner*—Harold Pitts
*Attorney, Agent, or Firm*—Simmons, Perrine, Albright & Ellwood

[57] ABSTRACT

Data collection apparatus includes an assemblage of a data collection terminal and a carrying case which is a combination of a printer module and a docking module which are joined and combined into a unitary structure. The carrying case has an attached handle which is preferably attached to the printer module. The carrying case further includes a holder for temporarily grasping an data collection accessory, such as a bar code scanner. The data terminal is quickly insertible and removable from the docking module. Communication connectors and communication wiring becomes coupled to the data collection terminal upon insertion of the data collection terminal into the docking module. If the data collection terminal is equipped with a scanner device attached by cable to the data collection terminal, the scanner device may temporarily be stored in the holder, such that the data collection terminal, including such a scanner, and a printer within the printer module can be ported at a single unit between various use points. The data collection terminal including the scanner may be operated while disposed within the docking module of the carrying case. As an assemblage with the apparatus, a support structure in form of a formed tray includes provisions for attachment to a shopping cart. The tray also includes a support frame about a cavity of the tray. The carrying case may be placed into the support frame such that the data collection terminal may be operated from within the docking module of the carrying case while the carrying case is supported by the tray within a shopping cart.

24 Claims, 5 Drawing Sheets

U.S. PATENT DOCUMENTS

| | | |
|---|---|---|
| 3,826,900 | 7/1974 | Moellering . |
| 3,830,554 | 8/1974 | Moussaian et al. . |
| 3,895,768 | 7/1975 | Scheck . |
| 4,038,535 | 7/1977 | Aldridge et al. . |
| 4,084,214 | 4/1978 | Eppich . |
| 4,208,081 | 6/1980 | Kekas et al. . |
| 4,345,147 | 8/1982 | Aaron et al. . |
| 4,396,985 | 8/1983 | Ohara . |
| 4,403,271 | 9/1983 | Flanigan et al. . |
| 4,409,470 | 10/1983 | Shepard et al. . |
| 4,458,813 | 7/1984 | Tushinsky et al. . |
| 4,468,750 | 8/1984 | Chamoff et al. . |
| 4,527,285 | 7/1985 | Kekas et al. . |
| 4,588,938 | 5/1986 | Liautaud et al. . |
| 4,590,943 | 5/1986 | Paull et al. . |
| 4,620,808 | 11/1986 | Kurtin et al. . |
| 4,621,189 | 11/1986 | Kumar et al. . |
| 4,634,304 | 1/1987 | Narushima et al. . |
| 4,645,275 | 2/1987 | Pucci . |
| 4,706,096 | 11/1987 | Sato . |
| 4,723,281 | 2/1988 | Peiker et al. . |
| 4,727,245 | 2/1988 | Dobbins et al. . |
| 4,739,183 | 4/1988 | Tokura et al. . |
| 4,739,316 | 4/1988 | Yamaguchi et al. . |
| 4,742,335 | 5/1988 | Vogt . |
| 4,746,932 | 5/1988 | Sato . |
| 4,751,648 | 6/1988 | Sears, III et al. . |
| 4,766,300 | 8/1988 | Chadima, Jr. et al. . |
| 4,773,032 | 9/1988 | Uehara et al. . |
| 4,790,431 | 12/1988 | Reel et al. . |
| 4,801,786 | 1/1989 | Stobbe . |
| 4,835,372 | 5/1989 | Gombrich et al. . |
| 4,845,738 | 7/1989 | Takano . |
| 4,846,924 | 7/1989 | Morrison . |
| 4,853,521 | 8/1989 | Claeys et al. . |
| 4,857,716 | 8/1989 | Gombrich et al. . |
| 4,881,839 | 11/1989 | Grimm . |
| 4,922,125 | 5/1990 | Casanova et al. . |
| 5,031,098 | 7/1991 | Miller et al. . |
| 5,186,558 | 2/1993 | Shermon et al. ............... 400/692 |

FOREIGN PATENT DOCUMENTS

| | | |
|---|---|---|
| 3408594 | 9/1985 | Germany . |
| 8801332 | 8/1988 | Germany . |
| 56-34468 | 4/1981 | Japan . |
| 198273 | 10/1985 | Japan . |
| 62-7582 | 1/1987 | Japan . |
| 173434 | 2/1935 | Switzerland . |
| 2045726 | 11/1980 | United Kingdom . |
| 2153237 | 8/1985 | United Kingdom . |
| 2175749 | 12/1986 | United Kingdom . |
| WO8805573 | 7/1988 | WIPO . |
| WO88805940 | 8/1988 | WIPO . |

OTHER PUBLICATIONS

Telxon Telxon Portable/Mountable Printer System, Form PDS IP–80, Oct. 1986.

Norand route–commander, "NP207 40–Column Briefcase Printer", Copyright 1987.

Norand Route–commander "80–Column and 40–Column Van Mount Printers", Copyright 1987.

IBM Technical Disclosure Bulletin, vol. 29, No. 8, Jan. 1987.

"Tray Assembly for Mounting Interchangeable Electromagnetic Devices".

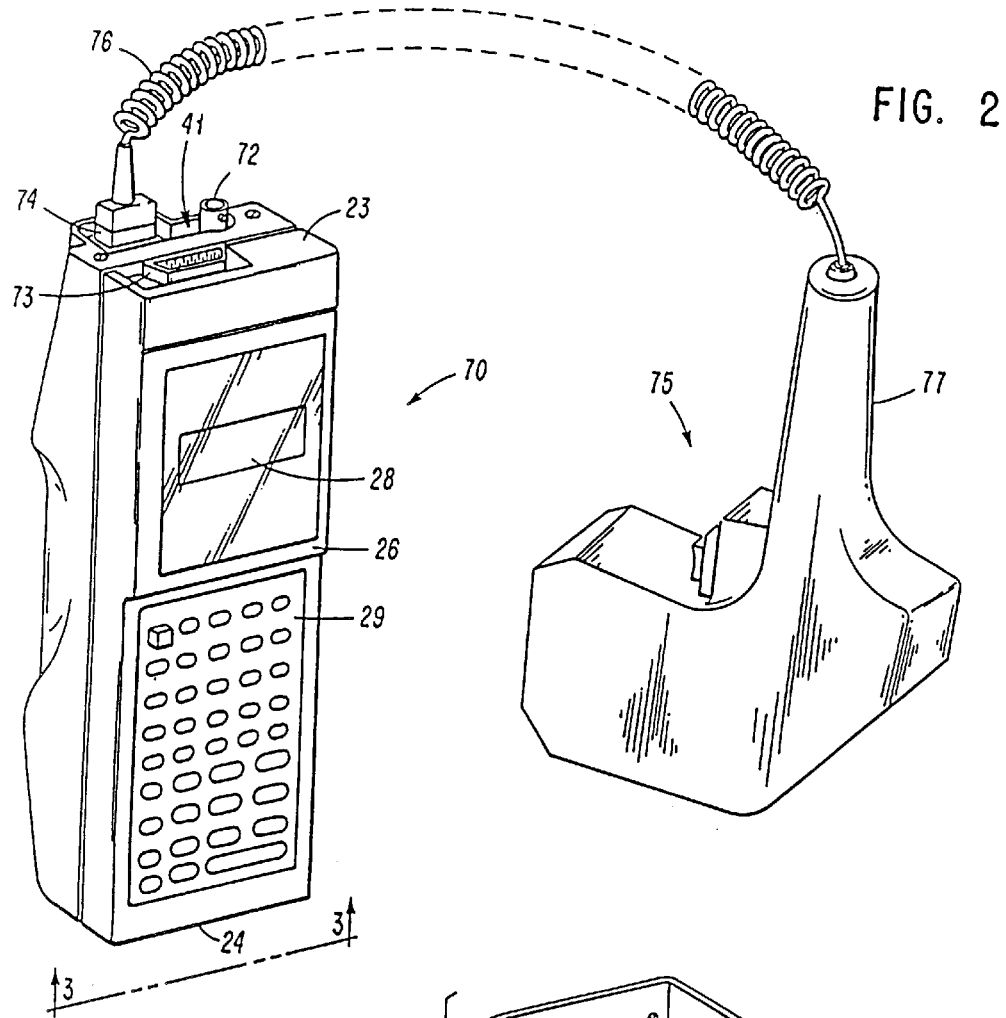
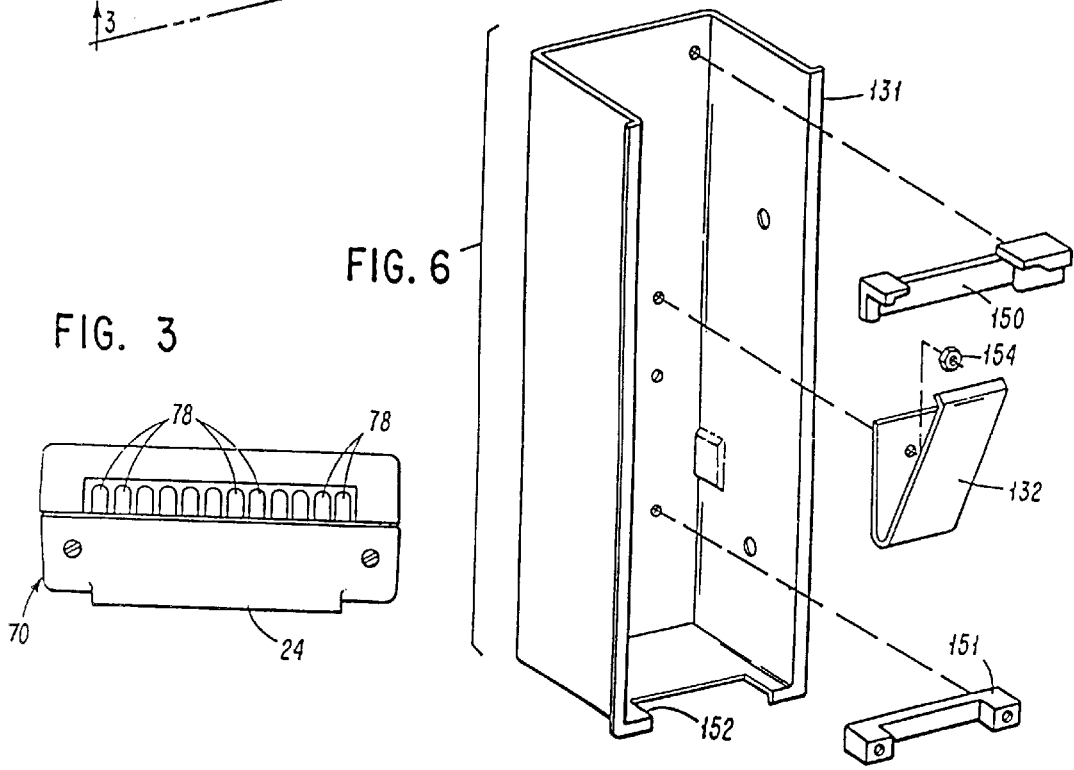

PORTABLE MODULAR WORK STATION INCLUDING PRINTER AND PORTABLE DATA COLLECTION TERMINAL

The present application is a continuation of U.S. application Ser. No. 08/291,305 filed Aug. 16, 1994, now U.S. Pat. No. 5,484,991 issued Jan. 16, 1996; which is a divisional of U.S. application Ser. No. 07/994,428 filed Dec. 21, 1992, now U.S. Pat. No. 5,347,115 issued Sep. 14, 1994; which is a continuation-in-part of U.S. application Ser. No. 07/759,740 filed Sep. 12, 1991, now abandoned; and said U.S. application Ser. No. 07/994,428 filed Dec. 21, 1992, being also a continuation-in-part of U.S. application Ser. No. 07/616,857 filed Nov. 21, 1990, now U.S. Pat. No. 5,186,558 issued Feb. 16, 1993 .

Said U.S. application Ser. No. 07/759,740 filed Sep. 12, 1991 being also a continuation-in-part of U.S. application Ser. No. 07/634,246 filed Dec. 26, 1990, now abandoned; which is a continuation-in-part of U.S. application Ser. No. 07/463,748 filed Jan. 12, 1990, now abandoned.

Reference is made to the following related patent applications, pursuant to 35 U.S.C. § 120: U.S. application Ser. No. 07/345,200 filed Apr. 28, 1989, having G. Hanson as a common inventor, now abandoned; U.S. application Ser. No. 07/426,135 filed Oct. 24, 1989, having G. Hanson as a common inventor, now U.S. Pat. No. 5,218,188 issued Jun. 8, 1993; U.S. application Ser. No. 07/549,298, having D. Schultz as a common inventor, now U.S. Pat. No. 5,180,232 issued Jan. 19, 1983; U.S. application Ser. No. 07/561,994 filed Jul. 31, 1990, having G. Hanson as a common inventor, now abandoned; U.S. application Ser. No. 07/876,776 filed Apr. 28, 1992, having G. Hanson and S. Salvay as common inventors, now abandoned; U.S. application Ser. No. 07/876,629 filed Apr. 30, 1992, having G. Hanson and S. Salvay as common inventors, now abandoned; U.S. application Ser. No. 07/909,139 filed Jul. 6, 1992, having G. Hanson as a common inventor, now abandoned; and U.S. application Ser. No. 07/948,034 filed Sep. 21, 1992, having G. Hanson and D. Schultz as common inventors, now abandoned.

Reference is also made to the following related non-copending patent applications, pursuant to 35 U.S.C. § 120: U.S. application Ser. No. 07/227,195 filed Aug. 2, 1988, having D. Schultz as a common inventor, now abandoned; U.S. application Ser. No. 07/346,771 filed May 2, 1989, having G. Hanson and D. Schultz as common inventors, now abandoned; U.S. application Ser. No. 07/347,602 filed May 3, 1989, having G. Hanson and D. Schultz as common inventors, now abandoned; U.S. application Ser. No. 07/529,353 filed May 25, 1990, having G. Hanson and S. Salvay as common inventors, now abandoned; U.S. application Ser. No. 07/558,895 filed Jul. 25, 1990, having G. Hanson and S. Salvay as common inventors, now abandoned; and U.S. application Ser. No. 07/854,115 filed Mar. 18, 1992, having G. Hanson and S. Salvay as common inventors, now abandoned.

Reference is made to the following related international patent application, pursuant to 35 U.S.C. § 119: PCT/US91/05234 filed Jul. 24,1991, having G. Hanson and S. Salvay as common inventors.

INCORPORATION BY REFERENCE

Each of the U.S. applications and the published PCT international application WO 92/02084 listed in this CROSS-REFERENCE TO PRIOR APPLICATIONS section is hereby incorporated herein by reference in its entirety including Appendices and drawings.

BACKGROUND OF THE INVENTION

Field of the Invention

The invention relates generally data collection apparatus including portable data terminal collection units, as, for example, hand-held data entry terminals. More particularly, the invention relates to portable data collection apparatus having printing capability.

Background

Portable data entry terminals also referred to as data collection terminals have seen ever increasing market applications in various industrial and commercial fields. Combined data collecting and data processing operations in conjunction with on-site printing operations have a potential for efficiency increases and cost reductions in the management of various types of route operations. In route operations the driver carries the data collection terminal to the customers' premises and enters data relating to the customers' purchases. The entered data may then be used to prepare invoices. Upon return to the vehicle, the driver returns the data collection terminal to a case housing a printer. The case includes electrical and communication connections to couple the data collection terminal to the printer. Data from the data collection terminal are then used to prepare the customers' invoices as immediate records of orders taken or of delivered purchases. At the end of a route, the data collection terminals are removed from the case in the vehicle and are coupled by wired arrangements to a central data processing station, also referred to as a central or host computer. Frequent removals and replacements of the data collection terminals to effect data transfer and printing may bring about some wear and tear on the data collection terminals and also on respective connecting interfaces.

Other fields of use for portable data collection terminals with potential for increases in efficiency relate to store and warehouse operations including activities such as inventory controls, merchandise restocking operations, customer service operations and real time pricing and sales record keeping. In warehouse and retail store operations, the data collection terminals are provided with radio frequency (RF) transceivers to communicate during use with a corresponding transceiver of a central host computer. In this manner data may be transferred on real time basis to the central computer. The data collection terminals may optionally also be equipped with bar code scanning devices as means for collecting bar code data from merchandise. Further options include bar code label printers which may be coupled to the data collection terminal directly or by means of cables. Inherently the combination of various functions increases the bulkiness of the apparatus which in turn affect the ease of working with the apparatus in a convenient manner.

The use of portable or hand-held data collection apparatus is seen as becoming more widespread as the apparatus becomes more practically suited to particular operations. With respect to retail stores and their merchandising operations improved data collection apparatus featuring compactness and improved handling and operational characteristics are desirable.

In retail store operations numerous tasks may be simplified by data collection terminals. Such tasks include among many others stocking merchandise items, price-marking stocked items, and marking shelves with item identifications to determine restocking requirements when empty shelves leave open questions on what items are in need of restocking. Handling the portable data collection terminals becomes at times cumbersome, when at the same time merchandise items and pricing and location information sheets may need to be handled.

SUMMARY OF THE INVENTION

In accordance with the invention, data collection apparatus comprises a carrying case including a combination of a printer module and a docking module arranged adjacent one another. The printer module and the docking module are rigidly attached to each other and a handle is attached to the combination for portability. The docking module receives a data collection terminal and communicatively and operatively couples the data collection terminal to the printer module for operating the printer module and the data collection terminal. The data collection terminal may be coupled to and operatively include a bar code scanner. The docking module preferably comprises cut-out end caps, such that the data collection terminal may be inserted in the docking module without need to operatively disconnect the bar code scanner from the data collection terminal while the data collection terminal is disposed within the docking module.

Thus, according to the invention, a portable, printing data collection apparatus comprises a portable data collection terminal and the combination of a printer module and a docking module for the portable data collection terminal. The portable data collection terminal includes a display and a keyboard and may include provisions for scanning data such as bar codes. The portable data collection terminal may also include communication means for transferring data to a data processing device. The docking module is preferably disposed adjacent and mounted to the printer module and includes electrical connections for data communication between a printer unit of the printer module and a portable data collection terminal docked in the docking module.

According to a particular aspect of the invention the printer module of the portable, printing data collection apparatus is an elongate substantially rectangular unit and the docking module is disposed adjacent one elongate side of the printer module. A handle is attached to the opposite elongate side of the printer module. The handle comprises means for releasably retaining data collection means such as a bar code scanner. As an alternate embodiment bar code retention means may be separately mounted to an outer side wall of the docking unit opposite to the handle attached to the printer module of the data collection apparatus.

According to another aspect of the invention, a data collection apparatus support includes a rectangular support frame for receiving the data collection apparatus. The support frame is supported by and part of a support structure having a bar grip stop at an underside of a first end of the support structure and a base support at an underside of a second end of the support structure. As a particular embodiment, the support structure is a plastic support tray having a rectangular main cavity, the support frame being an integrally molded rim about an upper opening of the main cavity, such that the data collection apparatus is cradled above the main cavity.

An advantage over prior art apparatus relates to improvements in the ability by a person to handle data collection apparatus as an assemblage forming a single unit including means for porting the apparatus as an assemblage forming a single unit between points of usage on the floor of a merchandise store.

Various other features and advantages of the invention will become apparent when the detailed description below is read in reference to the appended drawings.

BRIEF DESCRIPTION OF THE DRAWINGS

The detailed description refers numerically to elements of the drawings wherein:

FIG. 2 is a simplified pictorial representation of an alternate data collection terminal having an antenna and connector provisions in the top end thereof;

FIG. 3 is an end view of the base end of the data collection terminal of FIG. 2, showing a plurality of terminal contacts in the base end;

FIG. 6 is an exploded view of certain elements of the docking module shown in FIG. 4:

DETAILED DESCRIPTION OF THE INVENTION

Figure 1:
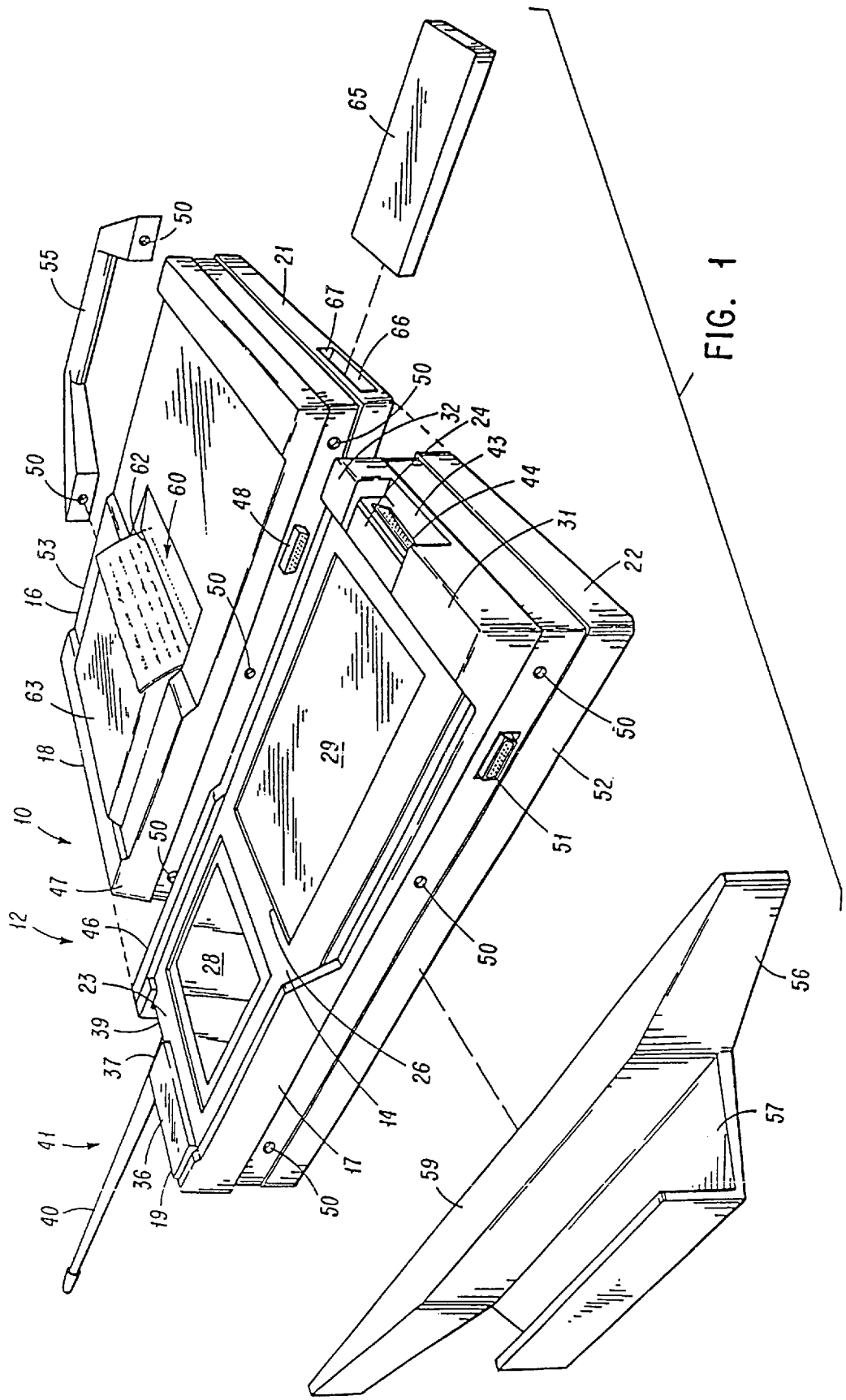
FIG. 1 is an exploded view of a data collection apparatus including a printer module and a docking module for receiving a data collection terminal and shown with a received data collection terminal, the printer module and docking module depicting features of the invention.

In reference to FIG. 1, a portable data collection apparatus is designated generally by the numeral 10. The data collection apparatus 10 is comprised generally of a terminal carrying case 12 and a data collection terminal 14. The terminal carrying case 12 in turn is comprised of two basic modules, a printer module 16 and a dock member, namely a data collection terminal docking module 17. The printer module 16 and the docking module 17 are both of substantially rectangular shape, having respective base ends 18 and 19 and top ends 21 and 22. When the apparatus 10 is in use, the base ends 18 and 19 would typically face an operator or user of the apparatus, with the respective top ends 21 and 22 of the modules facing away from the user.

The data collection terminal 14 is of an elongate, rectangular shape, having respective top and-base ends 23 and 24, and having an upper face 26, which is a substantially flat surface 26 intended to face the user. Thus, the upper face 26 typically has a display 28, such as a typical LCD screen, and a keypad or keyboard 29, which may be a flat touchpad type keyboard, as illustrated. In the alternative, the keyboard 29 may have individually depressible keys (not shown), in that the latter type keyboards are also well known in the art. The data collection terminal 14 is retained within the docking module 17 as shown, its upper face 26 with the display 28 and the keyboard 29 facing upward and the top end 23 of the data collection terminal being disposed toward the top end 19 of the docking module 19. A base end cap 31 has a cupped recess at the base end 22 of the docking module 17. The recess is formed by an upper lip 32 of the base end cap 31 which overlies the upper face 26 at the base end 24 of the data collection terminal 14, thereby cradling and retaining the base end. A top end cap 36 also features an upper lip 37 which overlies the upper face 26 at the top end 23.

The data collection terminal 14 is readily removed from the docking module 17, or re-inserted into the docking module as the case may be, by moving or displacing the top end cap 36 away from the top end 23 of the terminal 14. Such movement causes the lip 37 to move from an overlapping position with and to release the top end 23 of the data collection terminal 14. In furtherance of such a movement of the top end cap 36 between latching and unlatching positions, the top end cap 36 may be hingedly attached to the docking module 17. The top end cap 36 may then lock or detent when moved into the latching or terminal enclosing position. Alternatively, the docking module 17 may be provided with a spring-loaded follower similar to the top end cap 36 with the latching lip 37. The spring-loaded follower exerts a resilient force against the top end 23 of the data collection terminal 14 and urges the terminal 14 into a snugly abutting relationship with the base end cap 31.

The top end cap 36 preferably includes, as shown in the embodiment of FIG. 1, a slot or cutout 39. The top cutout 39 may be suitably sized to accommodate extending features, such as a radio antenna 40. The antenna 40 is typically an external element of an RF transceiver 41, the remaining elements of the transceiver 41 being typically disposed within the data collection terminal 14. A similar cutout 43 may be disposed in the base end cap 31 of the docking module 17 to provide access to one or more communication or power connectors, such as a connector 44. The connector 44 may, for example be coupled via suitable cable to a bar code scanner, such that the scanner may be operated while the data collection terminal 14 is retained within the docking module 17.

The docking module 17 and the printer module 16 are by choice of equal length between the top ends 19 and 18 and the base ends 22 and 21. The docking module 17 and the printer module 16 are mounted adjacent one another along facing side walls 46 and 47. A data communication connector 48 in the side wall 47 of the printer module 16 is aligned with a correspondingly mating data communication connector (not visible) disposed in the facing side wall 46 of the docking module 17. The side walls 46 and 47 are become rigidly attached to each other such as by common threaded screw fasteners through aligned mounting holes 50 disposed in both side walls 46 and 47. With such attachment of the side walls 46 and 47 and the communications connector 48 and its mating connector, the docking module 17 has become physically and communicatively coupled to the printer module 16. The data collection terminal 14 in turn is communicatively coupled via a plurality of external, spaced contact elements (see, for example FIG. 3), not shown in FIG. 1, disposed at the base end 24 of the data collection terminal 14. Upon insertion of the data collection terminal 14 into the docking module as shown, the contact elements are urged into contact with a plurality of corresponding spring contacts disposed at the base end 22 of the docking module. The spring contacts are electrically coupled to the connector in the side wall 46 and thereby to the connector 48 which in turn is communicatively coupled to the printer mechanism 60.

A reversal in the assembly of the docking module 17 and the printer module 16 is contemplated by duplicating the connectors 48 and its mating connector, such that a mating connector 51 is shown in a frontal side wall 52 of the docking terminal 17. The mating connector 51 would then be aligned with a duplicate connector (not shown) of the connector 48, such duplicate connector being disposed in a far side wall 53 of the printer module 16. Such duplicate connectors are of course electrically coupled in parallel to the printer connector 48 and its mating counterpart connector. The mounting holes 50 or equivalent mounting provisions are also provided for in the respective alternately facing side walls 52 and 53 of the respective docking and printer modules 17 and 16.

In furtherance of an object of the invention, the terminal carrying case 12 includes a handle 55 which is preferably attached to the printer module 16 as shown. Conveniently, the mounting holes 50 may be used to attach the handle 55 to the side wall 53 of the printer module 16. Additional mounting holes 50 may be closed off by conventional plugs (not shown). The side wall 52 of the docking module 17 may be provided with a cradle member 56 which includes a cradle or holder 57 for temporarily the scanner head or unit that may be attached by a suitable data cable to the data collection terminal 14. Thus, the data collection apparatus 10, including the printer module 16, the docking module 17, the data collection terminal 14 and optionally a bar code scanner unit may be hand-carried by a user in one hand. In that the data collection terminal 14 is operable while disposed within the docking module 17, the user may remove the bar code scanner head from the holder 57 and operate the scanner while holding the carrying case in the other hand. It should be noted that the cradle member 56 includes a mounting base 59 which covers the alternate and unused connector 51. In the alternative, in which the cradle member 56 is not attached to the side wall 52, a footer molding may be attached which may include in lieu of the holder 57 typical foot members attached to the base 59 which foot members would allow the carrying case 12 to be set upon such modified mounting base 59.

The printer module 16 houses a printer unit or mechanism indicated generally at 60. Various printer mechanisms 60 are commercially available, such as dot matrix printers or thermal printers which are available in a number of desirable widths. Printed or at least fed out paper 61 is shown as exiting from a paper exit slot 62 of the printer module 16, a supply of paper 61 being conveniently located within a housing 63 adjacent the top end 18 of the printer module 16. A battery 65 is inserted into a battery cavity 66 having an opening 67 at the base end 21 of the printer module 16. The battery 65 may be any one of commercially available batteries, and is preferably a rechargeable type battery, such as a lead acid battery used in various types of video camera recorders. The battery 65 desirably is suited to power the printer mechanism 60. The data collection terminal 14 is typically self contained and portable, including its own rechargeable power source, such that control signals are provided with respect to a common ground reference communicated via the connector 48 and its mating connector in a typical manner. It is understood that modifications in size of the modules are possible, though a compactness to promote ease of handling is a desirable feature in accordance with an object of the invention. It is understood that variations in data collection terminals may result in modifications of the described carrying case 12.

FIG. 2 is a simplified pictorial representation of an alternate data collection terminal which is designated generally by the numeral 70. The data collection terminal 70 is of elongate substantially rectangular shape as the data collection terminal 14. The upper face 26 includes the display screen 28 and the keyboard 29. The data collection terminal 70 also includes the transceiver 41 as indicated by an antenna mounting socket 72. Either a rigid antenna such as the antenna 40 may be mounted to the socket 72 or a flexible antenna may be preferred. The data collection terminal 70 is portable and self contained and includes typically an internal rechargeable battery (not shown). As a variation from the described data collection terminal 14, the data collection terminal 70 features at the top end 23 in addition to the antenna mount 72 at least one and in the depicted embodiment two D-type connectors 73 and 74. The connector 74 is contemplated to be coupled to a hand-held bar code scanner 75 via schematically shown cord 76. The bar code scanner has a typical hand grip 77 by which the scanner is held and pointed in the direction of bar code labels to be read. In accordance with the present invention, various types of scanners, such as CCD scanners or laser scanners may be used in conjunction with a data collection terminal such as the terminal 70. The connector 73 is contemplated to function as an alternate communications connector or as a combined communications and power connector, facilitating data transfer from the terminal 70 to other external data communications devices or power sources. The base end 24 of the data collection terminal 70 features a plurality of spaced terminal pads 78, as shown in the end view of the terminal 70 in FIG. 3. The terminal pads 78 are coupled internally of the data collection terminal 70 to data communication, to control and to power leads. The terminal pads 78 consequently provide the means for functionally coupling a data collection terminal, such as data collection terminals 14 or 70, to an external data device, such as the printer mechanism 60 described with respect to FIG. 1.

Figures 4, 5:
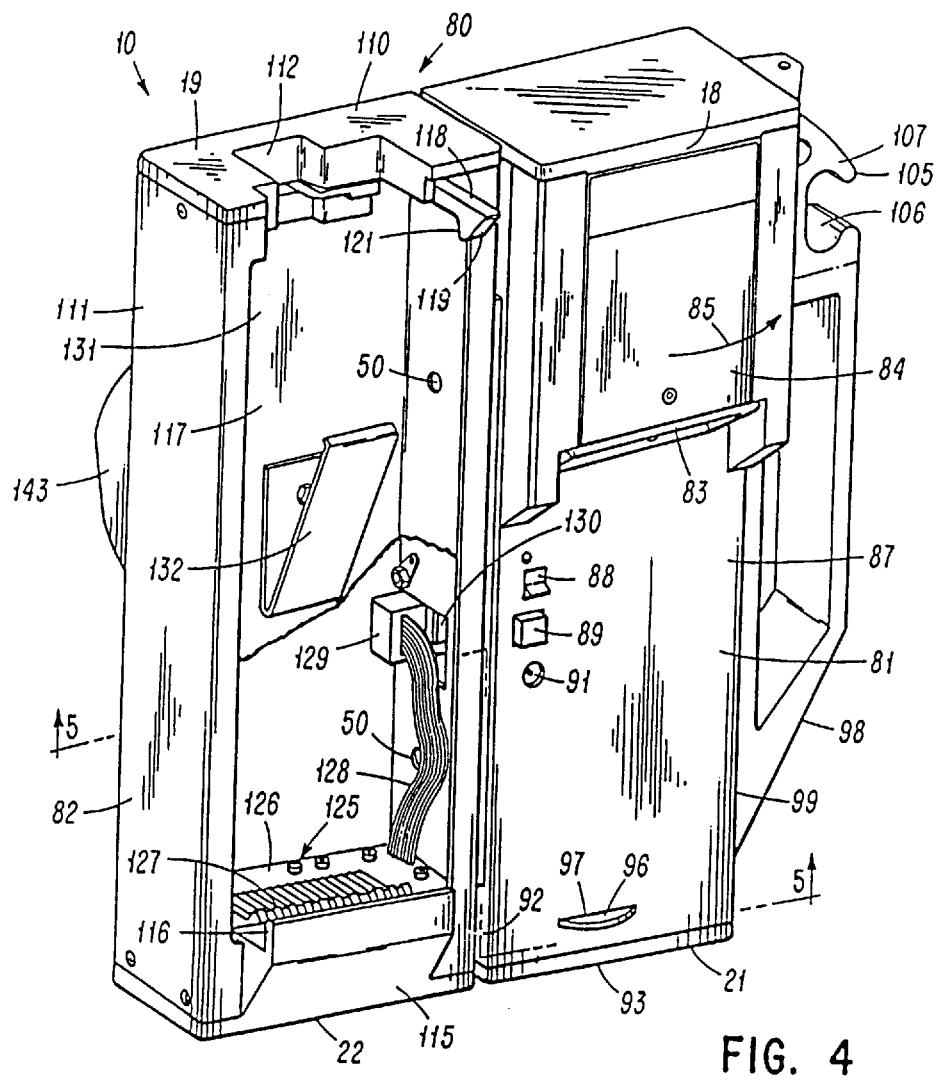
FIG. 4 is a simplified pictorial view of a currently preferred data collection apparatus which includes modifications of features shown in FIG. 1.
FIG. 5 is a sectional view along lines "5—5" shown in FIG. 4.

FIG. 4 is a somewhat simplified pictorial view of a terminal carrying case designated generally by the numeral 80. The carrying case 80 of the data collection apparatus 10 is a currently preferred embodiment of a carrying case in accordance with the invention and includes modifications over the embodiment described with respect to FIG. 1. As with respect to the case 12 shown in FIG. 1, the carrying case shown in FIG. 4 includes a printer module 81 which is attached substantially as already described to a docking module 82. The printer module 81 is contemplated for a preferred thermal printer 83 which is preferably disposed directly beneath a printer lid 84 of the printer module 81. In the preferred embodiment the printer module 81 is of elongate, substantially rectangular shape. The lid 84 is pivotally mounted adjacent the top end 18 of the module 81 to pivot upward in the direction of the arrow 85 giving access to a printer cavity and paper compartment disposed directly beneath the printer 83. A top surface of an upper wall 87 of the printer module 81 adjacent the lid 84 features printer controls which directly control the printer power via a preferred toggle switch 88 and paper feed via a push button switch 89. An external power socket 91 may be provided for supplying the printer mechanism with external power and further for charging a battery power source which is preferably disposed in a battery compartment 92 adjacent the base end 21 of the printer module 81. The base end 21 is preferably closed by a battery compartment door 93 which may be a molded part of shock absorbing plastic material. The battery compartment door 93 be attached by any of a number of convenient door latching or attachment means. In a preferred embodiment, the battery compartment door 93 comprises a twist knob (not shown) by which a latch bar 96 is rotatably moved into engagement with the upper wall 87 and an opposite lower wall of the printer module 81. Because of the thickness of material of the upper wall 87 the latch bar 96 extends through a slot 97 in the upper wall 87 of the printer module 81. Consequently, the visual presence of the latch bar 96 within the slot 97 is a positive indication that the battery compartment door 93 is firmly locking the battery compartment 92.

A handle 98 is firmly attached to an outward facing lateral surface 99 or side wall of the printer module 81. The handle 98 differs from the handle 55 described with respect to the embodiment in FIG. 1, in that the handle 98 further includes a holder socket 105 forming a transverse retainer channel 106 into which the hand grip of an accessory may be inserted. To facilitate the insertion of a hand-grip or the like into the retainer channel 106, the material of the socket about the retainer channel 106 is preferably molded of a resilient rubber type material. Thus an outer end 107 of the socket 105 will resiliently yield and clamp over a hand grip or other implement of substantially circular cross section, when such hand grip is inserted past the outer end 107 into the channel 106. In the preferred embodiment the printer mechanism 83 is preferably a 2.4 inch thermal printer. While such a printer is ideally suited for printing typical bar codes which may be attached to merchandise items, the printer is also capable of printing alphanumeric characters.

The docking module 82 differs structurally from the earlier described docking module 17 more than functionally. A top end cap 110 is fixedly attached to a top end of a longitudinal channel member 111. The top end cap 110 includes a cutout 112 configured to maintain unrestricted access to the antenna mount 72, and to the connectors 73 and 74 when the data collection terminal 70 is inserted into the docking module 82. At the base end 22 of the docking module 82, the longitudinal channel member 111 is closed off by a base end cap 115. The base end cap 115 includes a protruding upper retainer lip 116 behind which the data collection terminal 70 is retained when inserted into the docking module and urged toward the base end 22. The channel member 111 and the top end base end caps 110 and 115 form a terminal receiving cavity 117. The top end cap 110 further supports a latch lever 118 which functions to retain the inserted terminal 70 within the cavity. The latch lever is spring biased toward the base end 22 of the docking module 82, the pivotal movement of the latch lever 118 being desirably limited between reasonable limits even when the data collection terminal 70 is not inserted within the cavity 117 of the docking module 82. The terminal 70 may be inserted into the cavity 117 by placing the base end 24 of the terminal 70 beneath the lip 116 of the base end cap 115. When the top end 23 of the terminal 70 is then pushed downward into the cavity 117, the underside of the terminal 70 engages a sloped camming surface 119 of the latch lever 118, urging the latch lever against its spring bias toward the top end 19 of the docking module 70. When the upper surface 26 of the data collection terminal 70 has passed a detenting underside 121 of the latch lever, the latch lever 118 snaps toward the base end of the docking module, the detenting underside 121 of the latch lever 118 capturing and retaining the data collection terminal. The spring bias on the latch lever further urges the top end 23 of the data collection terminal 70 toward the base end of the docking module 82.

A spring contact assembly 125 is mounted to an inner surface of the base end cap 115. The spring contact assembly is preferably comprised of a circuit board or planar support 126 to which is mounted a contact assembly of a plurality of aligned spring contact elements 127. The spring contact elements 127 are spaced to correspond to the spacing of the terminal pads 78 in the base end 24 of the data collection terminal 70 (see FIG. 3). As the data collection terminal 70 is urged toward the base end 22, the terminal pads 78 engage and are urged against the spring contact elements 127. The spring contact elements are electrically connected through a flat cable 128 and a connector plug 129 to a connector 130. The communicative interconnection between the docking module 82 and the printer module 81 may of course be accomplished in any number of ways. A frequently used connector is a D-type connector which one mating part, such as the connector 130 may be mounted to the side wall of the docking module 82 to become coupled to the mating part of the connector, such as the connector 48 of the printer module 81. In this manner the data collection terminal becomes quickly coupled to the printer module 81 to communicatively control the printer mechanism 83 thereof. Electrically the data collection terminal 70 and the printer mechanism 83 function as an integral unit. The cable 128 shown in FIG. 4 is typically not visible within the cavity 117 in that it is hidden behind a liner 131 which extends the length of the cavity 117 except for the cut-way view for illustrative purposes. A leaf spring 132 disposed within the center of the cavity 117 has a normal upward bias as illustrated. A typical angle in the range of thirty to forty degrees is deemed adequate. During the insertion of the data collection terminal 70 into the docking module 82, the terminal is pressed toward the cavity 117 and the leaf spring 132 becomes compressed. When it is desired to remove the data collection terminal 70 from the docking module 82, the latch lever 118 is pulled toward the top end 19 of the module. As soon as the detenting underside 121 of the latch lever 118 releases the terminal 70, the leaf spring 132 pushes the data collection terminal upward past the latch lever 118. It is to be realized that the described terminal docking and releasing procedure is fast, simple and efficient. The carrying case 80 consequently provides a convenient manner of supporting the printer mechanism 83, and the data collection terminal 70 and a communicatively coupled scanner 75 shown in FIG. 2, such that a person may readily port the data collection terminal, the scanner and the printer with one hand.

FIG. 5 illustrates the manner in which the printer module 81 and the docking module 82 are conveniently mounted to each other and shows further advantages in their respective structures. The partial end view in FIG. 5 shows a lead acid battery 133 which occupies the entire lower end of an inner cavity 135 of the printer module 81. The printer mechanism of the preferred 2.4 inch thermal printer is conveniently disposed within the upper end of the cavity 135. The cavity 135 is of the same width as the cavity 117 of the docking module 82. Preferably both the printer module 81 and the docking module 82-are substantially formed of longitudinal channel members 136 and 111, respectively. In the preferred embodiment the channel members 111 and 136 are identical aluminum extrusions which then undergo further distinguishing finishing operations. The channel member 136 of the printer module 81 is used in an inverted position with respect to the channel member 111 of the docking module 82. A lower cover plate 137 has adjacent the top end 18 a downward depending paper tray extension 138 in the shape of a cylindrical segment. The added space within the cavity 135 provides room for a continuous strip of printer media, such as a roll of paper or label material to be maintained below the printer mechanism 83. Typically the printer mechanism 83 would be used to print labels which are individually attached to a continuous strip of backing material. The strip is obtainable on a roll. It has been found desirable to maintain the supply of media within the confines of the printer module 81. This is in clear contrast to typical state of the art printing calculators which provide media in rolled stock readily accessible at an upper end of such a device. While it may be convenient to store the supply of printer media externally and readily accessible, it has been found that in a typical commercial environment, the label material may get marred or otherwise damaged when externally stored, rendering it unfit for accurately displaying bar code label information. The printer module 81 is mounted to the docking module 82 spaced by a spacer plate 140. The spacer plate 140 has a thickness to provide correct spacing for mounting the connector 48 and its mating connector 130 to the respectively adjacent side walls 141 and 142 of the printer module 81 and the docking module 82. The spacer plate 140 with its constant thickness provides a stable mounting base for the joining of the two oppositely facing side walls 141 and 142. The attachment of the modules 81 and 82 may conveniently be accomplished with typical threaded fasteners or similar means through centrally apertures 50 disposed centrally of the mounting plate 140.

The combination of the printer module 81 and the docking module 82 is provided with a foot structure 143 mounted beneath the docking module 82 toward an outer wall 144 of the channel member 111. The foot structure 143 provides together with the paper tray extension 143 a support base for positioning the carrying case 80 at a slight incline with an upward tilt of the case with respect to the base ends 21 and 22. The foot structure 143 supports the docking module 82 at the same tilt as that of the printer module 81 when the carrying case 80 is placed on a flat surface with the terminal receiving cavity 117 of the docking module 82 facing up.

FIG. 6 shows the liner 131 of the docking module 82 separate from the docking module 82. A guide member 150 is preferably mounted to the inside of the liner 131 adjacent the top end 19 of the docking module 82. A lower guide member 151 is preferably mounted toward the base end 22 of the docking module 82. The guide members 150 and 151 have surface contours to correspond to similar surface contours of an adjacent surface of the data collection terminal 70. The corresponding surface contours help seat the data collection terminal 70 with respect to the spring contacts 127 upon insertion of the terminal 70 into the cavity 117. A cutout 152 is provided adjacent the base end of the module to allow the spring contacts to protrude into the cavity 117. The leaf spring 132 may be mounted by threaded fasteners 153 and respective nuts 154 or by other convenient means to the inside of the liner 131 after assembly of the liner into the cavity 117.

Figure 7:
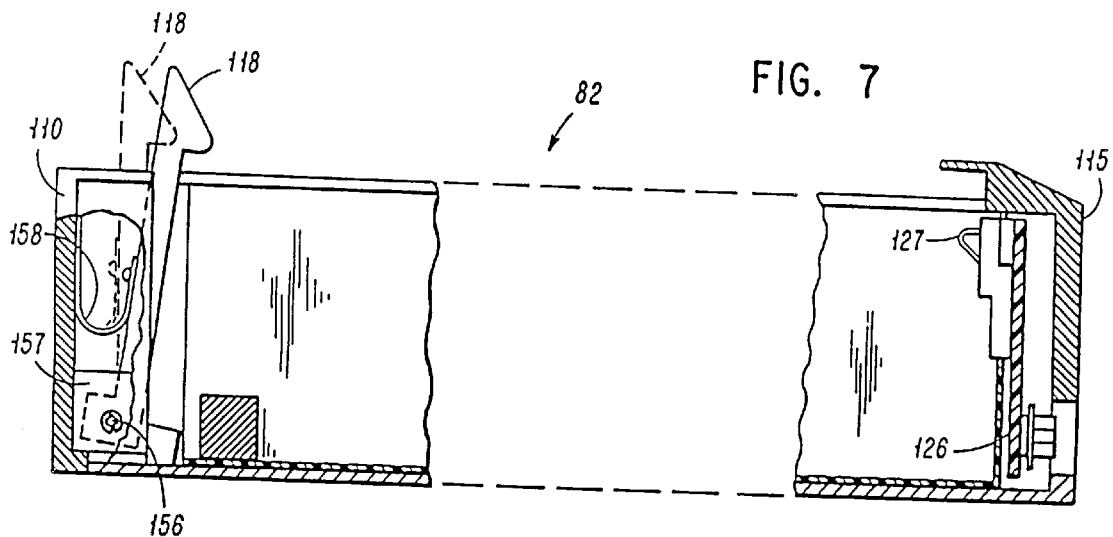
FIG. 7 is a partial foreshortened section through the docking module shown in FIG. 4, depicting a particular embodiment of a locking mechanism for retaining a data collection terminal inserted into the docking module.

FIG. 7 is a partial and foreshortened sectional view through the docking module 82 to show the latch lever 118 and its pivot mount in greater detail. The latch lever 118 is pivoted about a shaft 156 mounted to the top end cap 110 and a mounting bracket 157, see also FIG. 5. A spring 158 acting between the top end cap 110 and the latch lever 118 biases the latch lever normally to the forward position as shown. When a data collection terminal 70 is docked the lever 118 is urged back and the spring 158 becomes deflected to exert a respective counter force against the latch lever 118 to urge the data collection terminal into contact with the spring contacts 127.

Figure 8:
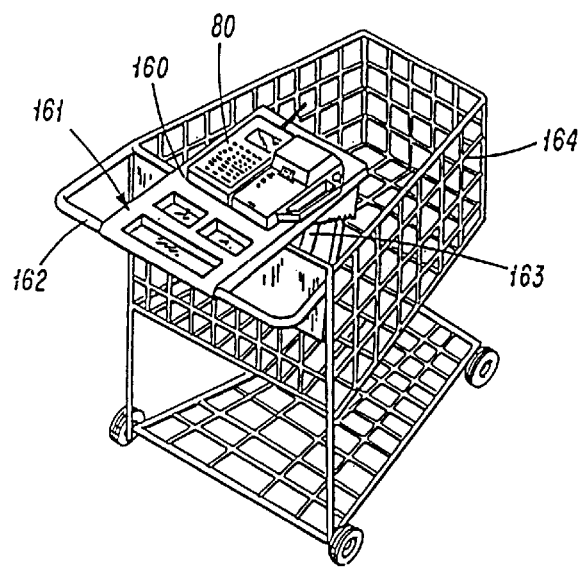
FIG. 8 is a somewhat simplified representation of the data collection apparatus supportively cradled by a support tray, the support tray being supported in turn by a shopping cart, such as for a contemplated use of the data collection apparatus on the floor of a merchandise store.
Figure 9:
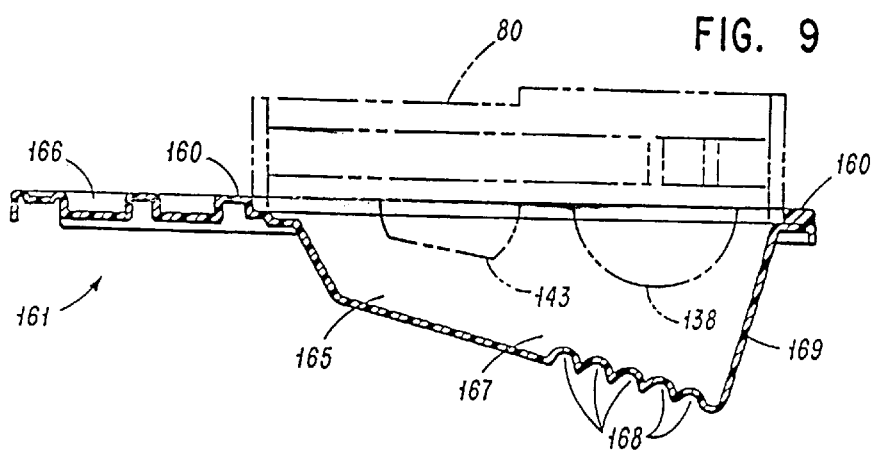
FIG. 9 is a sectional view of the support the support tray of FIG. 8 taken along the lines "9—9"

FIG. 8 shows the carrying case 80 supported within a support frame 160 of a support structure 161. In the preferred example depicted, the support structure is a molded support tray 161 which may be placed between the handle bar 162 and a backrest 163 of a baby's seat in a typical shopping cart 164. The support frame 160 is in the preferred embodiment a molded rim forming a seat for the carrying case 80, In reference to FIG. 9, showing a cross section through the preferred tray 161, the carrying case 80 (shown in phantom lines) is supported at the rim 160 above a substantial cavity 165 for holding additional accessories for the printer module 81, for example, such as additional rolls of paper or labels (not shown). Also, the depending paper tray extension 138 and the foot 143 extend downward into the cavity 165 when the carrying case 80 is laid flat into the frame 160. Additionally, more shallow trays 166 may be formed adjacent the handle bar position. In a base 167 of the cavity 165 a plurality of adjacent and parallel cross grooves 168 provide for seating the cavity end 169 of the tray 161 on the backrest 163 of various differently sized shopping carts. The multiple cross grooves 168 adapt the tray 161 to most shopping carts without special adjustments or modifications.

Figure 10:
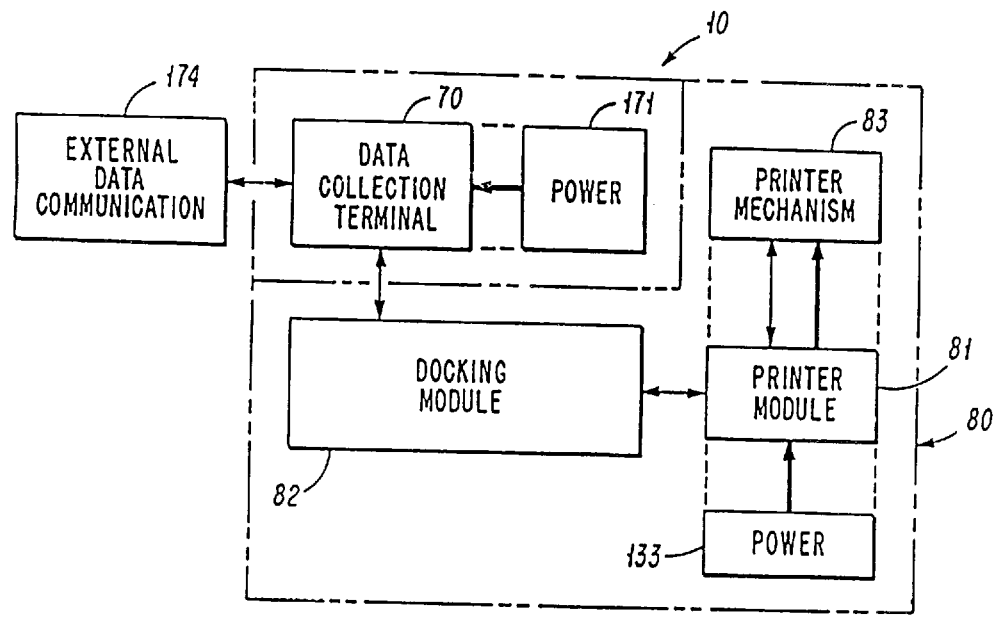
FIG. 10 is a block diagram showing a functional representation of data flow and power connections relating to the operation of the data collection apparatus.

FIG. 10 illustrates data flow and power management for the printer module and the data collection terminal 70, for example. The preferred embodiment of the carrying case 80, the printer mechanism 83 is powered by the battery 133. However, the data collection terminal 70 carries its own portable power source, such as a rechargeable battery 171, within the terminal 70. Data communication between the data collection apparatus 10 as described herein and external data devices, such as a host computer via the referred to transceiver 41, for example, or by direct connection of a cable to the communications connector 73, is indicated by an external data communication function at 174. The data collection terminal 70 consequently serves as data input terminal from the scanner 75, as shown in FIG. 2, via keyboard entries by a user, or via radio frequency communications from a host computer. The data collection terminal 70 also is the data output terminal for the outgoing data flow indicated at 174, for data display on the display screen 28 (see FIG. 2), or via the docking module 82 and printer module 81 (through connectors 48, 129 and 130 as shown in FIGS. 1 and 4) to the printer mechanism 83.

Figure 11:
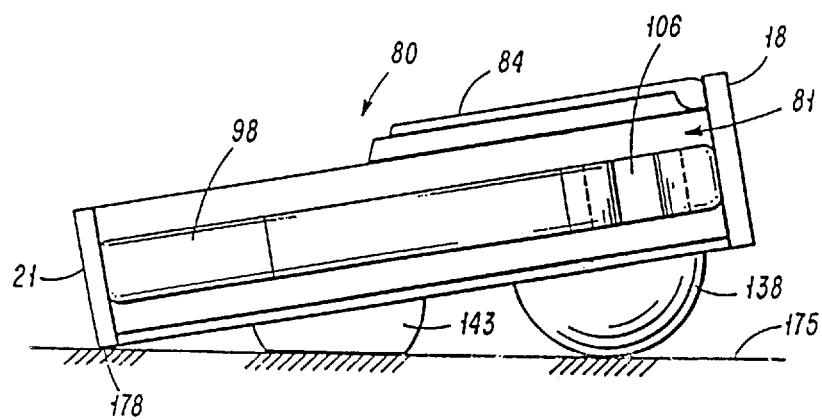
FIG. 11 is a side view of the data collection apparatus.

FIG. 11 shows a lateral end view of the carrying case 80 from the side of the handle 98. The carrying case is placed on a flat support surface 175 and is disposed at an incline with the top end 18 raised above the base end 21 of the printer module. The paper tray extension 138 rests against the support surface 175. The docking module 82 is supported by the foot structure 143 which is displaced with respect to the paper tray extension 138 toward the base end 21 by a sizable distance. A distinct advantage of the foot structure 143 is that the height of the foot structure 143 is less because of the displacement, such that the foot 143 is less likely to break off when the apparatus 10 as a unit is accidentally dropped while being carried about. It has been found that the docking module 82 does not need the support of the foot 143 at the very top end of the carrying case 80. When the data collection terminal 70 is inserted into the docking module 82, the keyboard 29 being disposed toward the base end of the docking module, the displaced foot 143 represents part of a three contact point support together with the paper tray extension 138 and a lowermost contact edge 178 with the support surface 175.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A printing apparatus for use with a portable computer, the portable computer having a user interface thereon and a top end to which an accessory or an antenna may optionally be attached, comprising:
    a) a housing,
    b) a printer module, located in said housing, having a printer for printing information,
    c) a docking module, located in said housing, for mechanically receiving the portable computer, and
    d) a connector system for electrically connecting the portable computer, while received by said docking module, to said printer module, so that information can be communicated from the portable computer to said printer,
    wherein said docking module is capable of receiving portable computers of various sizes.

2. The printing apparatus of claim 1, wherein the printing apparatus is a portable data printing apparatus.

3. The printing apparatus of claim 1, wherein the portable computer is a data collection terminal.

4. The printing apparatus of claim 3, wherein the accessory is an optical indicia reader.

5. The portable data printing apparatus of claim 2, wherein said housing further comprises a handle providing a hand-grip area for carrying the portable data printing apparatus.

6. The portable data printing apparatus of claim 2, wherein the user interface of the portable computer can be viewed and actuated by a user while the portable computer is received by said docking module.

7. The portable data printing apparatus of claim 6, wherein said docking module allows the portable computer to be operational while the portable computer is received by said docking module.

8. The portable data printing apparatus of claim 2, further comprising, within said housing, a power supply system having a battery for providing operating power to the portable data printing apparatus.

9. The portable data printing apparatus of claim 8, wherein said battery is a rechargeable battery.

10. The portable data printing apparatus of claim 2, wherein said printing module and said docking module are both substantially rectangular in shape.

11. The portable data printing apparatus of claim 2, wherein said docking module is designed so that the portable computer can be readily removed from and reinserted into said docking module.

12. The portable data printing apparatus of claim 2, wherein said docking module is shaped to permit insertion into said docking module of a portable computer having an accessory attached to the top end of the portable computer.

13. The portable data printing apparatus of claim 12, wherein said docking module is shaped to permit insertion into said docking module of a portable computer having an optical indicia reader accessory attached to the top end of the portable computer.

14. The printing apparatus of claim 2, wherein said docking module is shaped to permit insertion into said docking module of a portable computer having an antenna attached to the top end of the portable computer.

15. The printing apparatus of claim 3, wherein said housing further comprises a handle providing a hand-grip area for carrying the printing apparatus.

16. The printing apparatus of claim 3, wherein the user interface of the data collection terminal can be viewed and actuated by a user while the data collection terminal is received by said docking module.

17. The printing apparatus of claim 16, wherein said docking module allows the data collection terminal to be operational while the data collection terminal is received by said docking module.

18. The printing apparatus of claim 3, further comprising, within said housing, a power supply system having a battery for providing operating power to the printing apparatus.

19. The printing apparatus of claim 18, wherein said battery is a rechargeable battery.

20. The printing apparatus of claim 3, wherein said docking module is shaped to permit access of a user's fingers to a portion of at least one side of the data collection terminal to facilitate insertion and removal of the data collection terminal.

21. The printing apparatus of claim 3, wherein said docking module is shaped to permit access of a user's fingers to at least a portion of two opposite sides of the data collection terminal to facilitate insertion and removal of the data collection terminal.

22. The printing apparatus of claim 3, wherein said docking module is designed so that the data collection terminal can be readily removed from and reinserted into said docking module.

23. The printing apparatus of claim 3, wherein said docking module is shaped to permit insertion into said docking module of a data collection terminal having an antenna attached to the top end of the data collection terminal.

24. The printing apparatus of claim 4, wherein said docking module is shaped to permit insertion into said docking module of a data collection terminal having an optical indicia reader attached to the top end of the data collection terminal.

* * * * *